United States Patent [19]
Mayes et al.

[11] Patent Number: 6,091,170
[45] Date of Patent: Jul. 18, 2000

[54] STARTING OF SINGLE-PHASE MOTORS

[75] Inventors: Peter Richard Mayes; James Christopher Rudd Smart, both of Leeds, United Kingdom

[73] Assignee: Switched Reluctance Drives Limited, Harrogate, United Kingdom

[21] Appl. No.: 09/118,541

[22] Filed: Jul. 17, 1998

[30] Foreign Application Priority Data

Jul. 18, 1997 [GB] United Kingdom .................. 9715248

[51] Int. Cl.⁷ .......................... H02K 19/04; H02K 29/03; H02P 1/00; H02P 6/00
[52] U.S. Cl. ........................ 310/68 B; 318/701; 318/700
[58] Field of Search .......................... 310/68 B; 318/701, 318/700; 324/207.11, 207.12, 207.13, 207.19, 207.2, 207.21, 207.25

[56] References Cited

U.S. PATENT DOCUMENTS

| | | | |
|---|---|---|---|
| 4,616,165 | 10/1986 | Compter | 318/701 |
| 4,932,069 | 6/1990 | Ralph et al. | 318/809 |
| 5,122,697 | 6/1992 | Horst | 310/181 |
| 5,747,962 | 5/1998 | Fulton | 318/701 |
| 5,808,389 | 9/1998 | Stephenson | 318/701 |
| 5,866,962 | 2/1999 | Kim | 310/68 B |

FOREIGN PATENT DOCUMENTS

| | | | |
|---|---|---|---|
| 0 692 865 A2 | 1/1996 | European Pat. Off. | H02P 7/05 |
| 0 734 117 A2 | 9/1996 | European Pat. Off. | H02P 7/05 |
| 44 45 356 A1 | 6/1996 | Germany | H02P 6/00 |
| 2 305 022 | 3/1997 | United Kingdom | H02P 6/20 |

OTHER PUBLICATIONS

Stephenson, J.M., et al. "The Characteristics, Design and Applications of Switched Reluctance Motors and Drives," PCIM '93, Jun. 21–24, 1993.

*Primary Examiner*—Nestor Ramirez
*Assistant Examiner*—Burt Mullins
*Attorney, Agent, or Firm*—Patterson & Keough, P.A.

[57] ABSTRACT

A rotor position transducer for an electronically commutated electric motor has a vane mounted to rotate with the rotor and a pair of sensors, according to one embodiment. One sensor has an output coincident with positions of zero torque. The other sensor produces signals slightly in advance. Overlapping portions of the signals denote regions of different levels of torque. The second sensor output can also be used in high-speed, single-pulse control of the motor. Method embodiments and other apparatus embodiments are also disclosed.

25 Claims, 7 Drawing Sheets

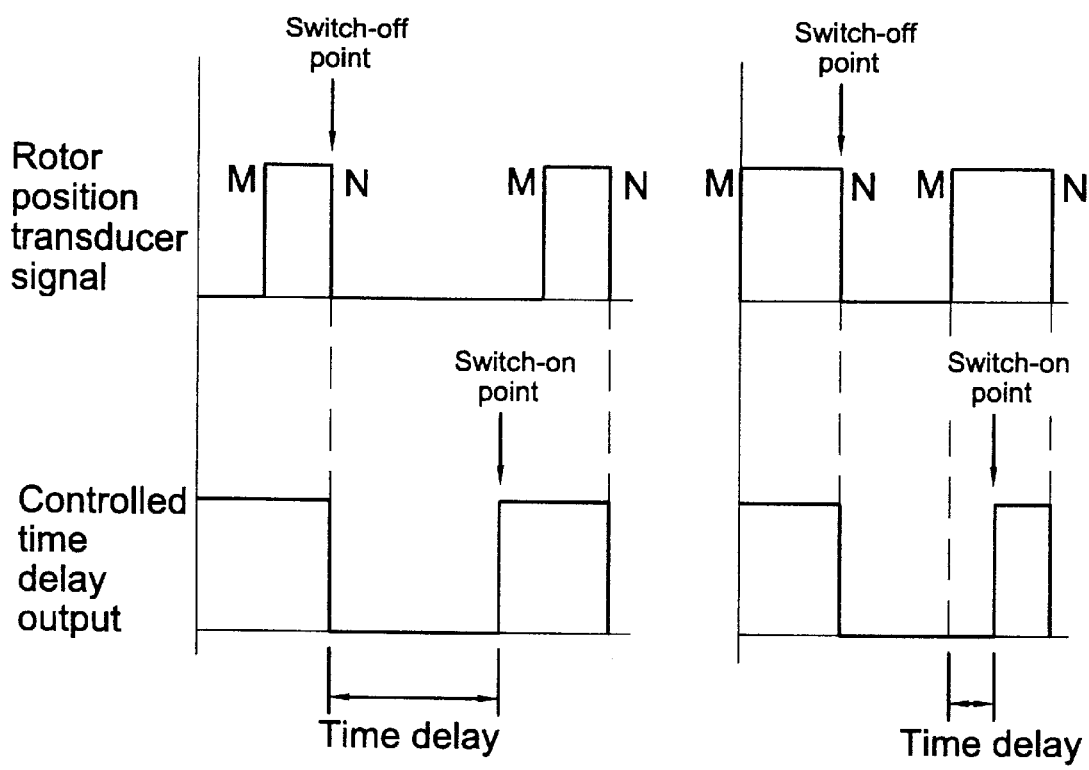

United States Patent

STARTING OF SINGLE-PHASE MOTORS

BACKGROUND OF THE INVENTION

1. Field of the Invention

This invention relates to single-phase, electronically commutated electrical machines. The invention is particularly, though not exclusively, applicable to single-phase switched reluctance motors.

2. Description of Related Art

Switched reluctance machines typically comprise a stator, with salient stator poles and stator windings for energizing the stator poles, and a rotor with salient rotor poles. The rotor is mounted in bearings to allow it to rotate coaxially with the stator. Movement of the rotor is influenced by the stator poles according to the energization of the stator windings. The theory and design of such machines is well documented in, for example, the paper 'The Characteristics, Design and Applications of Switched Reluctance Motors and Drives' by Stephenson and Blake, presented at the PCIM '93 Conference and Exhibition at Nurnberg, Germany, Jun. 21–24, 1993, which is incorporated herein by reference.

In common with other types of electrical machines, switched reluctance machines can have one, two or more independent circuits, known as phases. These are discussed in the reference above. While each phase number is associated with a variety of different advantages, it is generally accepted that the single phase system is particularly cost-effective for low-power drive systems. An example of a single-phase machine is illustrated in FIG. 1. The stator S and the rotor R of the machine in FIG. 1 each have two salient poles, both stator poles having an exciting coil C wound around them. The two coils are connected together to form the phase winding. This example shows two poles on each of the stator and rotor, but other numbers of poles can be used. Further, this example shows the rotor rotating internally in the stator bore, though arrangements are known where the rotor rotates around the outside of the stator (these are known as 'inverted' machines).

FIG. 2 illustrates the static torque curve of the machine, i.e. the torque T developed when an arbitrary, constant excitation current is applied to the phase winding as a function of the angle of rotation θ of the rotor. Such a curve is a characteristic of doubly salient motors and can be calculated or measured.

Machine control includes the 'chopping' mode of motor torque regulation at low speed. The torque is controlled by inhibiting the winding current from rising above a maximum level by repeatedly chopping it during the phase conduction period. At higher speeds the rise and fall times for the current will be such that the current is switched on and off only once for each phase conduction period and is not chopped in normal operation. The torque is controlled through the switching angles, i.e. the angular positions at which voltage is applied to and reversed at the phase winding. This is the so-called 'single-pulse mode' of operation. Both the chopping and single-pulse modes are discussed in the Stephenson and Blake paper referred to above.

Such machines are normally 'rotor position switched', i.e. the voltage is applied to and reversed at the phase winding according to the angular position of the rotor. The rotor position is determined either by a physical transducer which measures rotor shaft position or by algorithms which deduce the position from other variables in the machine, such as current and flux. In low-cost drives, simple position transducers are generally used, typically comprising an optical or Hall-effect device fixed to the stator and acting as a sensor to detect the proximity of a castellated vane or magnet assembly mounted on the rotor shaft. The vane usually has the same number of castellations as the rotor has poles, though other arrangements are possible.

Known arrangements of transducers typically use a single sensor for one-and two-phase systems, two sensors for a four-phase system and three sensors for a three-phase system. In a single-phase system with one sensor, simple logic is used to decode the output of the sensor to provide rotor position information within one rotor pole pitch. In the machine of FIG. 1, the sensor would normally be positioned to indicate when the rotor poles were fully aligned with the stator poles (i.e. the rotor position shown and generally known as $L_{max}$, since the phase winding has maximum inductance at this rotor position). Assuming the vane has a mark/space ratio of unity, the sensor would also indicate the position 90° away (generally known as $L_{min}$, since the phase winding has minimum inductance at this position), i.e. with the rotor poles midway between the stator poles.

Positive torque is here defined as driving the motor in the forward, clockwise direction so that the angle of rotation θ is increasing positively in FIG. 2. It will be appreciated with reference to FIG. 2 that the motor will only start from rest in the forward direction if the motor is in a position corresponding to a region of positive torque, i.e. in the region between points 2 and 4 of FIG. 2. On the other hand, if the phase winding is energized when the rotor is in a region corresponding to negative torque, i.e. between points 5 and 6, the rotor will move in the reverse direction. If the phase winding is energized in a region of substantially zero torque, i.e. at least between points 1 and 2 or between points 4 and 5, the motor will fail to start.

In order to overcome this problem of unreliability in starting, various methods are known for positioning the rotor in the correct angular position with respect to the stator before energizing the phase winding, thus ensuring that the motor will start and will rotate in the desired direction. Such a system is disclosed in, for example, U.S. Pat. No. 4,932, 069, incorporated by reference herein, which discloses the use of so-called 'parking' magnets generally mounted on the stator and acting on the rotor to hold it at rest in a preferred starting position. Such a position would typically be around point 3 on FIG. 2, where the torque is at or near a maximum value.

There is one characteristic of parking magnets that is often apparent when the drive has been operating and is switched off. The rotor coasts down in speed until the speed is low enough for the magnets to 'grab' the rotor and prevent further forward movement. The rotor then oscillates around a final resting position, the amplitude of the oscillations gradually decaying as the kinetic energy in the rotor is dissipated in friction and in eddy current losses induced by the field of the magnets in the stator and rotor. This process of coasting down and oscillating can take some time, particularly when the load torque diminishes with decreasing speed and the friction in the system is low. This characteristic can introduce some problems to the operation of the drive. For example, if the drive is switched off and an attempt is made to restart shortly afterwards, the rotor may still be in an oscillatory condition when the RPT signal indicates that the rotor is in an appropriate position for excitation to be reapplied to the windings. Under these conditions, the winding may be energized when the rotor has swung past its region of maximum developed torque towards the region of near zero torque (e.g. from point 3 in FIG. 2 towards point 4). At this point, the torque from the parking magnet opposes the (relatively small) main torque and the rotor is likely to stay in that position, failing to start.

In some known systems, the sensor is so positioned that it produces signal transitions in advance of the rotor reaching the aligned position. This is done for reasons associated with better operation at high speeds. It follows that, at zero or low speeds, where energization of the phase winding is linked directly to the edges of the sensor pulse train, these systems could allow energization of the winding in a region where the negative torque is sufficient to set the rotor into rotation in the opposite direction. While to overcome these and other problems it is possible simply to wait until the oscillations die away and the rotor is in a desired starting position, this may not be acceptable to a user requiring a rapid restart.

SUMMARY OF THE INVENTION

It is an object of embodiments of the present invention to provide a rotor position transducer which provides more reliable starting of electrical machines, particularly of single-phase switched reluctance motors, than has previously been possible.

It is a further object of embodiments of the invention to provide a rotor position transducer for an electrical machine which allows for faster restarting.

According to one aspect of the invention there is provided an electric machine comprising a stator defining stator poles, a single phase winding for energizing one or more of the poles, a rotor defining rotor poles and a rotor position transducer comprising a member arranged to rotate with the rotor, a first sensor arranged to be influenced by the movement of the member to produce first signals indicative of positions of the rotor relative to the stator of substantially zero torque, and a second sensor arranged to be influenced by the member to produce second signals indicative of positions angularly in advance of the first signals, intervals between the first signals and the second signals being indicative of different regions of torque production.

Embodiments of the invention include introducing a second sensor to the conventional rotor position transducer for a single-phase machine, which sensor is positioned in such a way as to provide extra information on the position of the rotor. This allows the control system of the machine to determine when the windings should be energized, thus providing reliable starting, and when the phase windings should not be energized, thus avoiding rotation in the wrong direction. The second sensor may also be used as a timing sensor for the operation of the machine at high speeds.

Also according to embodiments of the invention there is provided a system comprising a machine as defined above, a controller and a switch arrangement which is operably connected for actuation by the controller to energize the phase winding, the controller being responsive to the first and second signals to determine timing of the starting procedure in accordance with the said intervals to actuate the switch arrangement thereby enabling the machine to start reliably.

The invention also extends to a method of starting a single-phase machine as referred to above, the method comprising monitoring the first and second signals; and energizing the phase winding in an interval between one of the first and one of the second signals to move the rotor in a desired direction.

BRIEF DESCRIPTION OF THE DRAWINGS

The invention can be put into practice in various ways, some of which will now be described by way of example, with reference to the accompanying drawings in which:

FIGS. 8(a)–8(b) are timing diagrams for delay control using the system of FIG. 7.

DETAILED DESCRIPTION OF PREFERRED EMBODIMENTS

Figure 1:
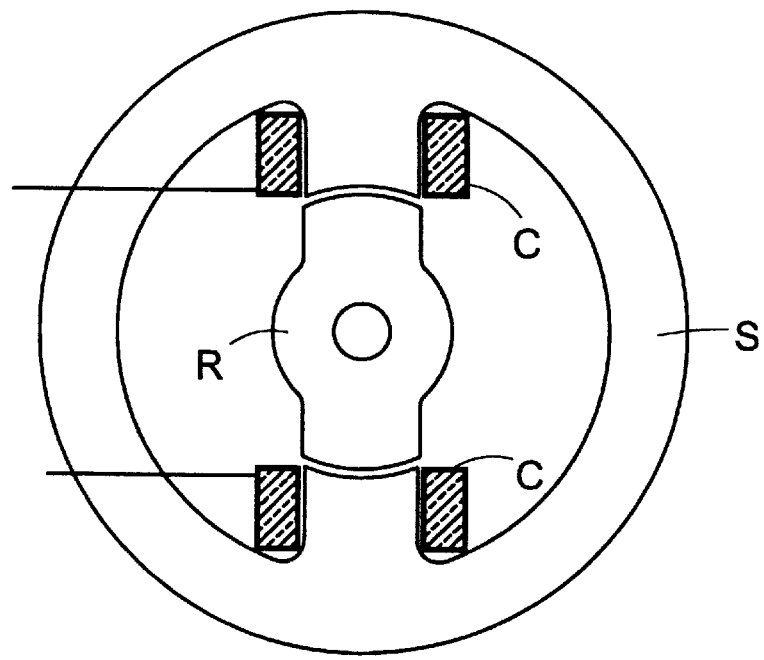
FIG. 1 is a cross-section of a known single-phase switched reluctance machine.
Figure 3:
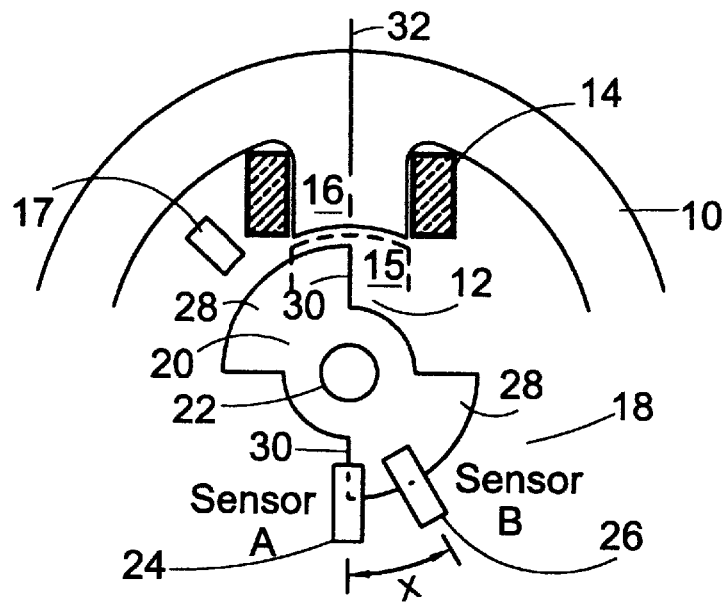
FIG. 3 is a schematic diagram of the position of sensors relative to the stator of a motor according to an embodiment of the invention.
Figure 4:
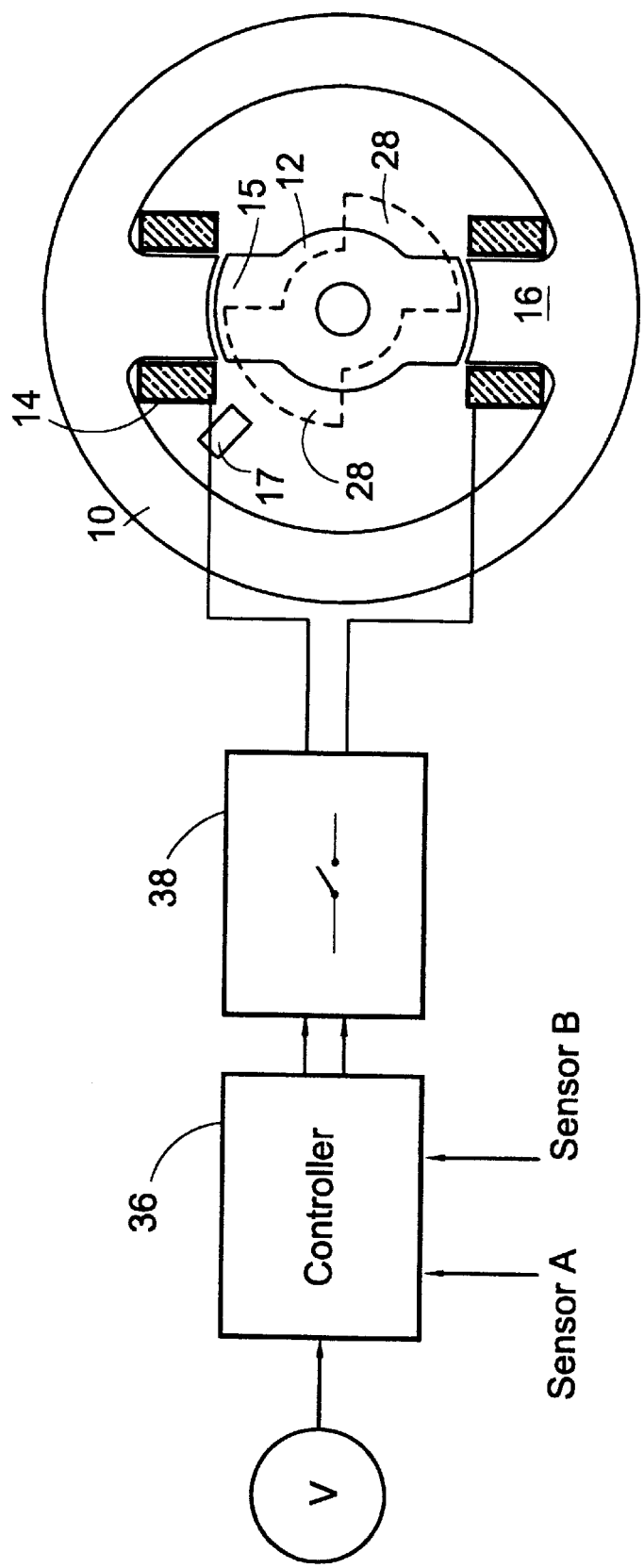
FIG. 4 is a schematic diagram illustrating a motor system according to an embodiment of the invention.

FIG. 3 shows the arrangement of a rotor position transducer (RPT) on a reluctance motor in accordance with an embodiment of the invention. FIG. 4 shows a first embodiment of the invention having the structure of FIG. 3 incorporated in a switched reluctance machine drive. The drive includes a reluctance machine having a stator 10 and a rotor 12. Coils 14 are mounted on each of a pair of opposed stator poles 16 and are connected to form a phase winding. The rotor 12 defines opposed rotor poles 15. A parking magnet 17 is mounted on the stator as shown in FIG. 3. At rest, and assuming a sufficiently low load on the motor, the parking magnet will attract the rotor so that it is maintained in a non-zero torque starting position. For the sake of clarity these components are only partially depicted in the motor of FIG. 3. For this illustrative embodiment they have the same structure as the single-phase machine of FIG. 1 with the addition of the parking magnet 17. As with FIG. 1, the number of poles on either or both of the rotor and stator may differ from that depicted.

An RPT 18 comprises a vane 20 which is mounted to rotate with the rotor 12 on a shaft 22. First and second position sensors 24 and 26 are arranged to be influenced by the passage of sectors 28 of the vane 20.

The RPT 18, unlike known RPT's for single-phase electronically commutated machines, has the two position sensors 24 and 26 which cooperate with the vane 18. In this example, the vane is made of aluminum or some other suitable material which is opaque to the infrared light to which the sensors respond. Also in this example, the sensors are optical switches, Part No. HOA 0825 made by Honeywell Inc. of Freeport, Ill., U.S.A. It will be understood by the skilled person that other types of sensor, e.g. Hall-effect or capacitive sensors could be used in conjunction with a suitable vane.

Figure 5:
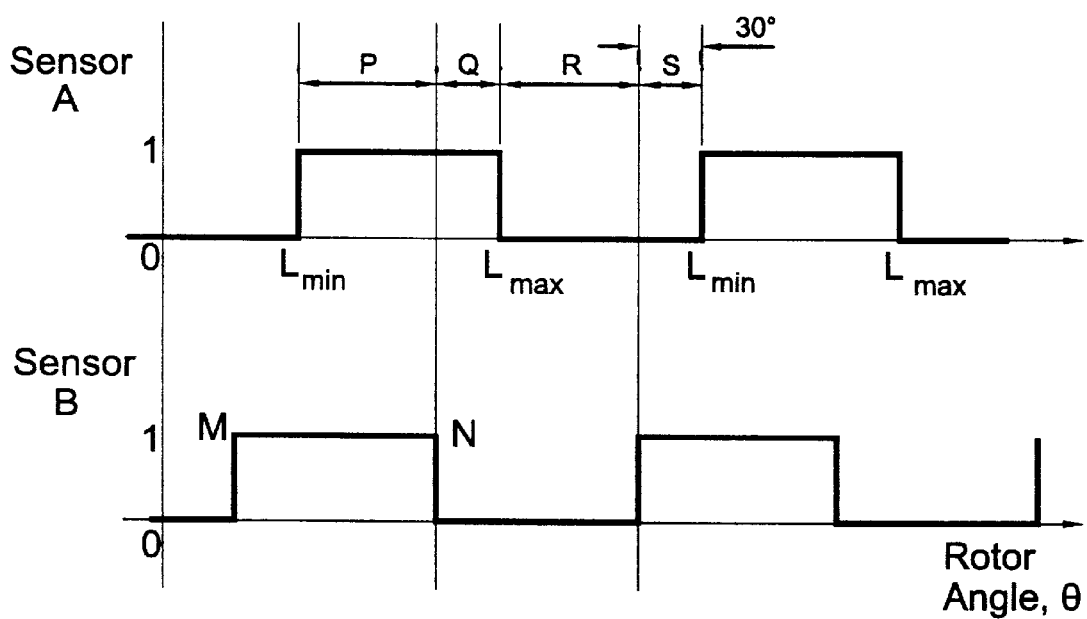
FIG. 5 is a diagram of the position sensor outputs of FIG. 3.

The position of an edge 30 of each of the sectors 28 of the vane 20 relative to a corresponding rotor pole, and the position of the first sensor 24 relative to the stator pole 16 are such that the first sensor 24 indicates the angular coincidence of the centerline of that rotor pole 15 with the centerline 32 of the stator pole 16 (i.e. the position of $L_{max}$). The sectors 28 on the vane have a unity mark/space ratio with respect to the voids between them. During the passage of a void past a sensor the sensor output is high. Thus, the first sensor also indicates the passage of the centerline of the interpolar space on the rotor 12 past the centerline 32 of the stator pole 16 (i.e. the position of $L_{min}$). The output of the first sensor 24 is shown in FIG. 5 as a function of rotor angle for the rotor rotating clockwise in FIG. 3. It will be seen that the output of the first sensor is a unity mark/space ratio signal, with transitions coincident with the points of minimum and maximum inductance, in accordance with the position of the first sensor relative to the vane 20.

The second sensor 26 is positioned to cooperate with each sector 28 at a position that is angularly displaced by an angle X from the first sensor 24 in FIG. 3. In this example the angle X is 30°. In general terms, the angle should be around 0.17 of the rotor pole pitch, though values between 0.10 and 0.20 will generally be acceptable. The output of the second sensor 26 is also shown in FIG. 5. The output of the second sensor is essentially the same as that of the first, but advanced by 30° in the rotor cycle.

It will be apparent to the skilled person that the sensor and the vane could all be shifted with respect to the stator and rotor poles without changing the nature of the information derived from the RPT. In other words, by shifting both the vane and the sensors by the same angular amount the sensors would indicate the same positions of the rotor as it rotates. It is sometimes necessary to shift the sensors and the vane in this way because of space requirements or for convenience of mechanical fixing.

In the embodiment shown in FIG. 4, a motor controller 36 controls the actuation of a conventional switch arrangement 38 for energizing the phase windings in response to an input speed or torque demand. The movement of the vane past the sensors 24 and 26 produces two outputs that are decoded by the controller 36 for starting the machine and actuating the switches in response thereto.

Figure 2:
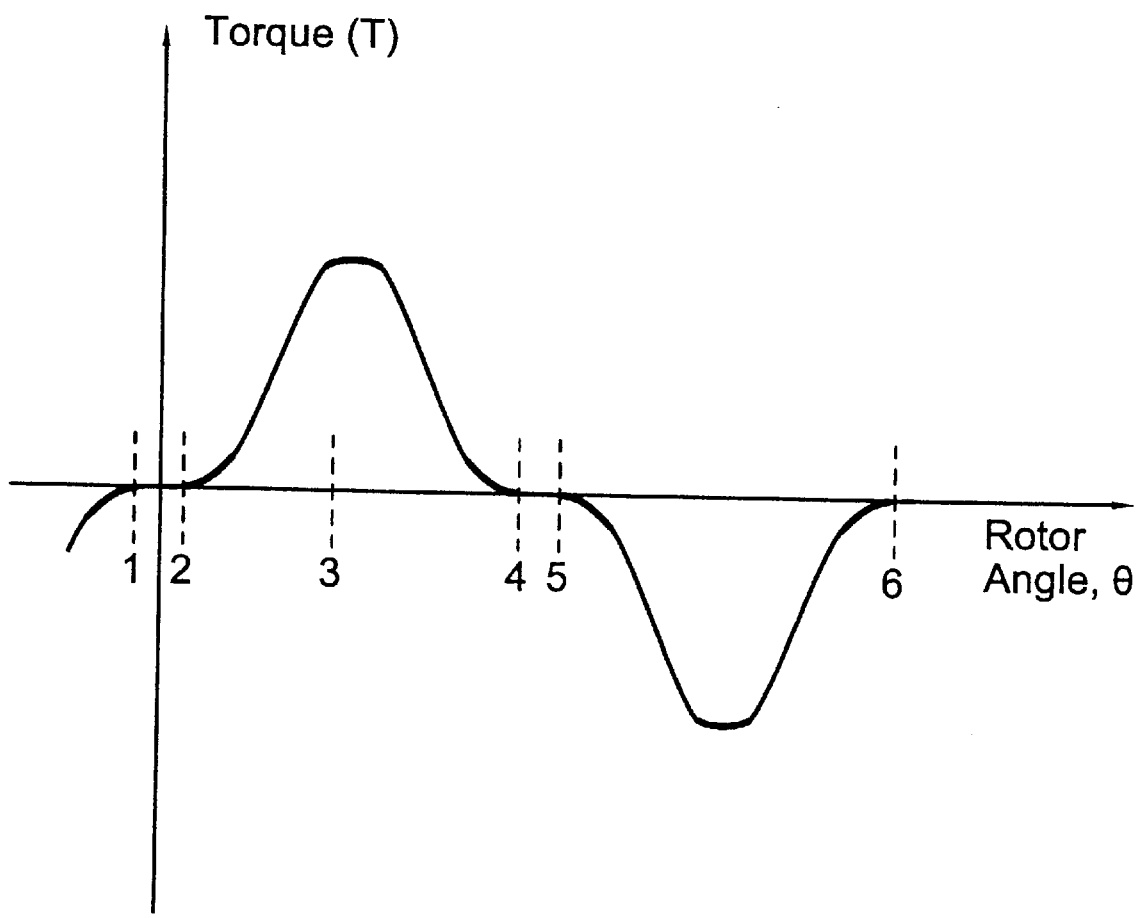
FIG. 2 is a diagram of static torque for the machine of FIG. 1.

One way of making use of the extra information afforded by the presence of the second sensor 26 is to combine logically the two outputs and for the controller 36 to allow the energization of the phase winding only when the first and second sensor outputs are both high, i.e. in region P of FIG. 5. This prevents energization near the $L_{max}$ position where, by inspection of FIG. 2, it will be seen that the torque is low and insufficient energy would be imparted to the rotor to enable it to overcome the retarding torque of the parking magnet 17. This energization scheme improves the reliability of the starting process. This can be implemented easily by supplying the outputs from the sensors 24/26 to the controller 36 for the switched reluctance motor and using combinational logic to allow firing signals for the phase energization to be available only at the desired rotor angle, i.e. in the region P of FIG. 5. It will be apparent from FIG. 5 that the starting region P is signified by both of the digital outputs of the sensors 24 and 26 being high or '1'.

In a modification of the invention, use is made of the extra information provided by the second sensor 26 by using not only the extra position information but also the directional information which may be deduced from the sequence of occurrence of the rising and falling edges of the two outputs from the sensors 24 and 26. When a command to start the drive is received by the controller 36, the position of the rotor can be immediately determined to be in one of the four regions P, Q, R or S from the output of the two sensors. The controller 36 waits to receive information as to whether the rotor moves to another region. If, for example, the region R is followed by the region Q, the rotor is moving anti-clockwise and no action is taken. The monitoring process continues until the rotor is known to be moving in a clockwise direction in either region P or Q. The phase winding is then energized in the normal way and the motor will start and run up to speed using conventional energization patterns thereafter, as known in the art.

Figure 6:
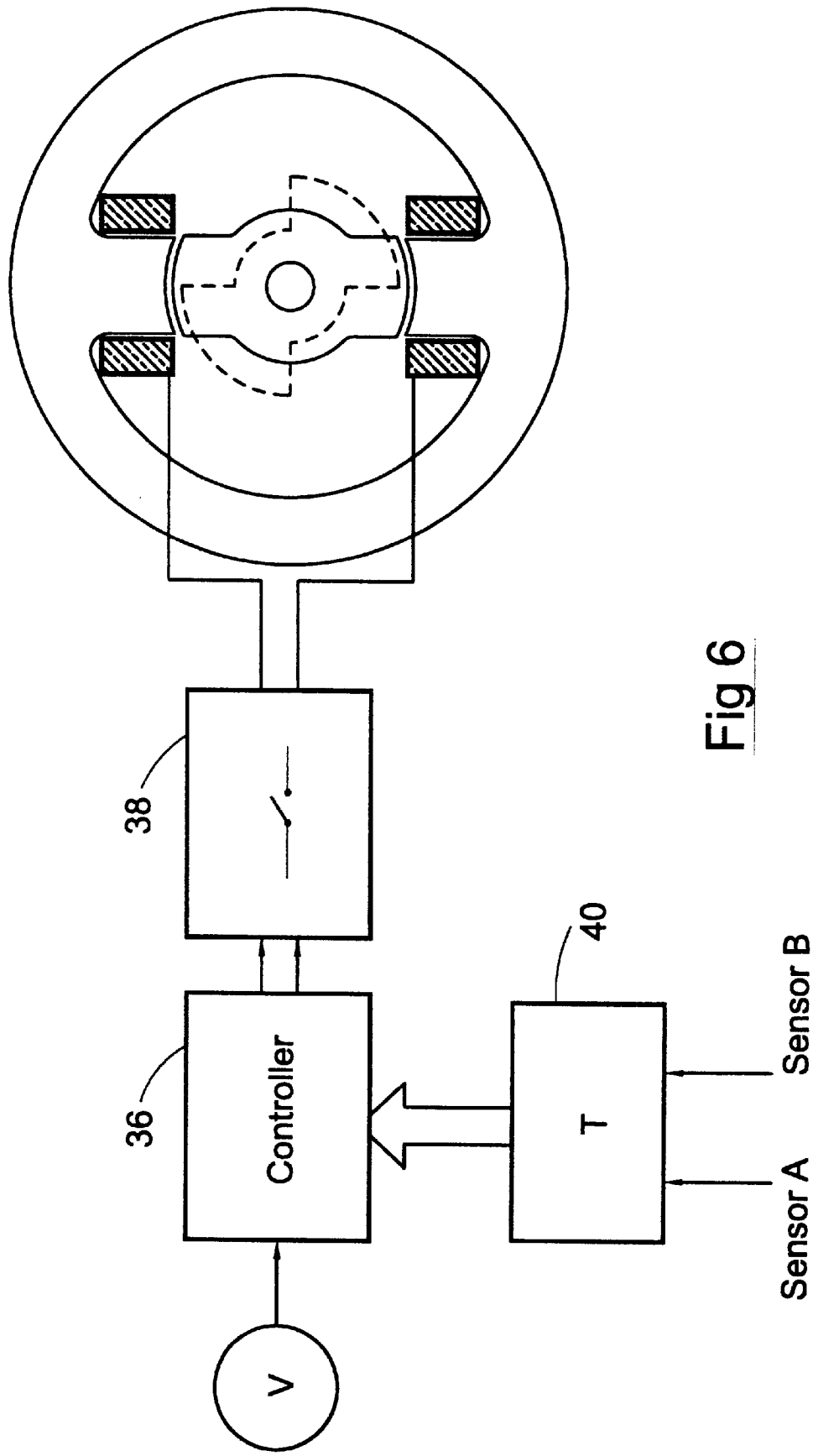
FIG. 6 shows a machine and control system according to an embodiment of the invention.

In a further embodiment shown in FIG. 6, a timer 40 is incorporated. Normally, the timer would form part of the controller 36 although it is shown as a separate entity in FIG. 6 for the sake of clarity.

The timer 40 is arranged to receive the output of the two sensors 24 and 26. From the received outputs, the timer 40 times the movement of the rotor from one region to another after a command is received to switch on. The purpose of the timer 40 is to determine when the rotor 12 has effectively come to a halt, in which case the timer reaches some predetermined timeout count without being reset by a change in one of the outputs from the sensors 24 and 26. This can be taken to indicate that the oscillations have died away and the drive can be restarted using any suitable method for starting from rest.

Because of the non-linearity of the torque imparted to the rotor by the parking magnets, both the amplitude and frequency of the oscillations vary during the settling period. However, a predetermined timeout value of around 200 msec has been found to be appropriate for small drives rated up to around 1 kW. Larger drives may require a commensurate increase in the timeout value. While this method can use virtually any spacing between the sensors, it is found that setting the transition point of the second sensor to be approximately at the detent or rest position of the parked rotor under the influence of the starting magnet is preferred. This is because information provided by the two sensors on the position of the rotor is at its densest for the rotor movement close to the energization point.

When the starting routine has been commenced, the timer 40 can be reset and used to monitor the subsequent starting routine. If the position information from the first and second sensors does not indicate that the rotor has moved through, say, two of the regions P, Q, R and S in a predetermined initial period, the starting routine is aborted and the drive allowed to settle before another attempt is made to restart. A suitable initial period may be of the order of 400 msec for a small drive.

The presence of the additional, second sensor 26 in the RPT 18 can also be used once the drive has attained its operating speed. EP-A-0692865 (Turner), incorporated by reference herein, discloses a method of generating firing angles for a switched reluctance machine which determines the switch-on angle by timing a delay period from a rising or falling edge of an RPT signal.

Figure 7:
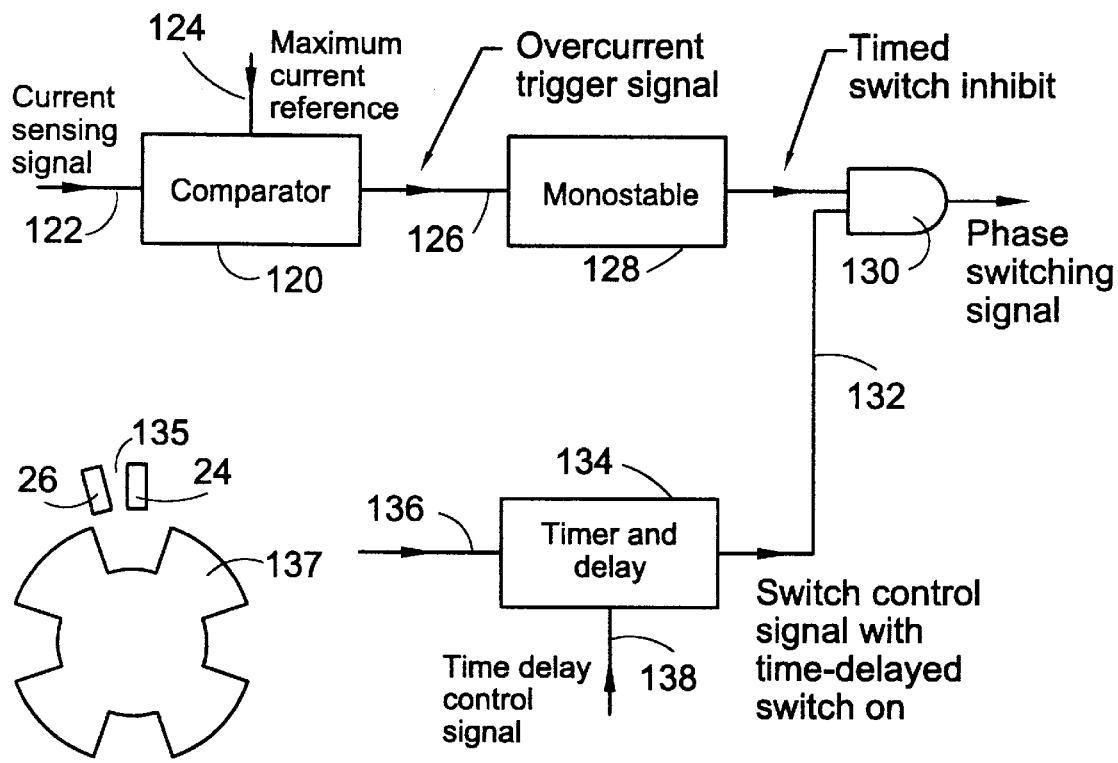
FIG. 7 is a schematic diagram of a delay control system incorporating an embodiment of the invention.

Referring to FIG. 7, a controller for a switched reluctance motor comprises a comparator 120 which is arranged to receive a first input 122. This is a signal proportional to the phase winding current in the motor. A typical comparator for this application would be an LN339 manufactured by National Semiconductor with or without additional hysteresis components, but of course other comparators are contemplated according to the invention.

A second input 124 corresponds to a predetermined or adjustable maximum current reference signal. In the case of a fixed value of current reference a simpler comparator can be used, such as an appropriately biassed transistor. In this embodiment, having the simplified comparator, the reference signal is chosen for a particular motor to correspond to a level of current which is above the peak value of current which will be expected to occur in the single-pulse mode. This allows an automatic transition between chopping and single-pulse modes of operation, as will be described below.

An output 126 from the comparator 120 triggers a monostable multivibrator 128 which has a pulse output of fixed duration at logic level '0' corresponding to a switch-off signal that is connected to one input of a two-input AND gate 130. The other input to the AND gate 130 is the output 132 from a timer and delay circuit 134. A first input 136 to the timer and delay circuit 134 is the output from the rotor position transducer 135. The RPT 135 is in accordance with the present invention.

It will be seen that the RPT comprises a vane having four sectors 137 which produce digital outputs from the first and second sensors 24 and 26 of even mark/space ratio. The four sectors 137 indicate that it is attached to a four-pole rotor of a single-phase machine. The second sensor 26 is spaced from the first sensor 24 by between 0.1 and 0.2 of the rotor pole pitch, i.e. 9°–18°. In this embodiment the rotor pole pitch is 90°. The outputs of the sensors 24 and 26 are used on startup, as described above, by the controller. Following startup, only the output of one of the first or second sensors 24/26 need be used in controlling the motor. The output from the RPT sensors 24 and 26 is more or less a square or other wave shape providing transitions at the fixed rotor position with respect to the stator as referred to previously. Starting the motor is achieved as described above using the controller 36.

A further input 138 to the timer and delay circuit 134 is a time delay control signal which adjusts the delay applied before a switch-on signal is applied to the AND gate 130. While an AND gate is shown, it will be apparent that other mutual gating arrangements could be used to equal effect.

The running speed of the motor may be adjusted by manual adjustment of the delay introduced by the timer and delay output 132 which is itself controlled by the signal 138 or in response to a signal from an overall control system also adjusting the time delay. Alternatively, the output 132 may be fixed. The delay strategy is discussed below.

In a low-speed chopping mode, the comparator 120 generates its output when the winding current exceeds the predetermined maximum current reference signal 124, which reference signal 124 is set for a particular motor to which the controller is connected. As mentioned above, this may be equivalent to a winding current which is in excess of the current expected in single-pulse mode at which the motor in question is designed to operate. Typically, the maximum current reference level is chosen with regard to the ratings of the semiconductor switches in the converter switching circuits and the thermal rating of the motor. The maximum current reference signal may be user adjustable, within the current rating of the switches, so that a particular controller can be adjusted and set for a particular motor or as a means of speed or torque adjustment while the motor is running.

At low speeds, there is sufficient time in a phase conduction period for the winding current to rise above the maximum current reference level. The output from the comparator generated when the maximum current reference is exceeded triggers the monostable multivibrator 128 which produces a pulse of fixed duration at logic level '0', which is a winding current switch inhibit (switch-off) signal. This logic '0' output will produce a logic '0' (switch-off) output from the AND gate 130 so that the switching circuit associated with the phase winding is opened for at least the duration of the low pulse, i.e. to allow the winding current to fall below the maximum current reference level. After the pulse is removed, the switch or switches reclose, subject to the state of the signal from the timer and delay circuit 134. Thus, chopping current control is established about the maximum current reference level when the motor speed is low.

As the motor speed increases, there will come a point at which the maximum current reference level is not reached in a phase inductance cycle such that the output from the monostable multivibrator 128 is a constant logic '1'. This permanently enables the AND gate 130 subject to the timed output of the timer and delay circuit 134, which is then used to control the switching of current to the windings, i.e. for operating in the single-pulse mode. The motor speed/torque is then controllable by adjustment of the delay before a switch-on signal is generated by the timer and delay circuit 134.

Two methods of triggering the time delay are illustrated graphically in FIGS. 8(a) and (b).

In FIG. 8(a), an output of the RPT has a trailing edge N which is used both to switch off the current in the phase winding and to start timing a delay. After expiration of the predetermined delay, the current is switched on again and the cycle repeats.

In FIG. 8(b) the delay is initiated by the rising edge M of the RPT signal. In either case, the time delay from the switch-off may be set to give, for example, a near optimum conduction angle at the desired full-power operating condition, according to the motor being controlled, or it may be varied, using the delay circuit to control the torque and running speed of the motor.

It will be noted that, while the system described is simple to implement and operate, the positioning of the switch-off point is triggered by the falling edge N of the RPT output. While it is possible to move this edge by mechanically adjusting the position of the RPT vane with respect to the rotor poles, this may compromise the starting performance of the machine.

It will be appreciated that high-speed control of a switched reluctance motor can be improved relatively easily by incorporating embodiments of the present invention, since the second sensor 26 provides further rising and falling edges, thus giving more flexibility as to the choice of edge to be used from which to initiate the control delay. The output of the first sensor 24 has a trailing edge aligned with the $L_{max}$ position, which is a suitable switch-off point for those operating speeds just above the chopping mode region. As the speed rises further, it is beneficial to advance the switch-off point. The trailing edge of the output from the second sensor 26 provides a suitable edge. Thus, by careful choice of the angle of advancement of the second sensor with respect to the first, an edge of the second sensor can be arranged to be in a position that can also be used for driving the machine after startup at high speeds. Thus, the machine can be started by the use of information from the two sensors, as described above, run up to some intermediate speed in chopping mode by use of the information derived from the first sensor 24 and thereafter operated in its high-speed operating range under single-pulse control by use of the information from the second sensor 26.

While the illustrated embodiments show a pair of sensors, it is possible to derive the same information from a single sensor and a suitably shaped vane. It will be appreciated that the indications of points in the rotor cycle are related to rising and falling edges. Thus, the single sensor embodiment would have a vane shape that replicates the transitions in the first and second signals at the appropriate positions of the rotor. By this technique the advanced second signals are determined by the vane shape which is suitably modified for the purpose. The two sensor outputs described above would then be amalgamated as a single sensor output providing the various transitions of both previous signals.

While the above has described the invention applied to a switched reluctance motor, it can equally be applied to any electronically commutated machine in which the machine is controlled as a function of rotor position.

The above description of multiple embodiments is made by way of example and not for the purposes of limitation. Many variations can be made to the embodiments disclosed herein. For example, the invention is applicable to any form of reluctance machine regardless of the number of poles, pole shape, speed range, etc. The invention is intended to be limited only by the spirit and scope of the following claims.

What is claimed is:

1. An electric machine, comprising:
    a stator defining stator poles;
    a single phase winding for energizing one or more of the poles;
    a rotor defining rotor poles;
    a rotor position transducer comprising a member arranged to rotate with the rotor; and
    at least one sensor arranged to be influenced by the movement of the member to produce first and second signals indicative of positions of the rotor relative to the stator of substantially zero torque, and positions angularly in advance of the first signals, intervals between the first and the second signals being indicative of different regions of torque production;
    wherein the second signals are advanced with respect to the first signals by between 10% and 20% of the rotor pole pitch.

2. A machine as claimed in claim 1 in which the second signals are advanced with respect to the first signals by 17%.

3. An electric machine, comprising:
    a stator defining stator poles;
    phase winding means for energizing one or more of the poles;
    a rotor defining rotor poles;
    a rotor position transducer comprising a member arranged to rotate with the rotor;
    sensing means, influenced by the movement of the member, for producing first and second signals indicative of positions of the rotor relative to the stator of substantially zero torque, and of positions angularly in advance of the first signals, intervals between the first and second signals being indicative of different regions of torque production;
    means for monitoring the first and second signals; and
    means for energizing the phase winding means in an interval between the first and second signals to move the rotor in a desired direction.

4. A method of starting a single-phase electrical machine system, the electric machine comprising a stator defining stator poles, a single phase winding for energizing one or more of the poles, a rotor defining rotor poles, a rotor position transducer comprising a member arranged to rotate with the rotor, a first sensor arranged to be influenced by the movement of the member to produce first signals indicative of positions of the rotor relative to the stator of substantially zero torque; and a second sensor arranged to be influenced by the member to produce second signals indicative of positions angularly in advance of the first signals, intervals between the first signals and the second signals being indicative of different regions of torque production, the method comprising:
    monitoring the first and second signals; and
    energizing the phase winding in an interval between the first and second signals to move the rotor in a desired direction.

5. A method as claimed in claim 4, including:
    decoding the sequence of first and second signals to determine the direction in which the rotor is moving; and
    continuing or discontinuing starting the machine in response to the decoded sequence.

6. A method as claimed in claim 4, including:
    timing the period between the first and second signals prior to starting; and
    starting the machine if the period exceeds a predetermined threshold.

7. A method as claimed in claim 6, including:
    resetting the timing to monitor the progress of the startup according to the subsequent occurrence of the first and second signals.

8. An electrical machine system comprising:
    an electric machine, comprising:
        a stator defining stator poles;
        a single phase winding for energizing one or more of the poles;
        a rotor defining rotor poles;
        a rotor position transducer comprising a member arranged to rotate with the rotor; and
        at least one sensor arranged to be influenced by the movement of the member to produce first and second signals indicative of positions of the rotor relative to the stator of substantially zero torque, and positions angularly in advance of the first signals, intervals between the first and the second signals being indicative of different regions of torque production;
    a controller; and
    a switch arrangement which is operably connected for actuation by the controller to energize the phase winding, the controller being responsive to the first and second signals to execute a procedure in accordance with the said intervals to actuate the switch arrangement to start the machine, wherein the controller is operable to decode the first and second signals, to determine whether the rotor is moving in the desired direction, and to continue or discontinue starting the machine in response to the decoded outputs.

9. An electrical machine system comprising:
    an electric machine, comprising:
        a stator defining stator poles;
        a single phase winding for energizing one or more of the poles;
        a rotor defining rotor poles;
        a rotor position transducer comprising a member arranged to rotate with the rotor; and
        at least one sensor arranged to be influenced by the movement of the member to produce first and second signals indicative of positions of the rotor relative to the stator of substantially zero torque, and positions angularly in advance of the first signals, intervals between the first and the second signals being indicative of different regions of torque production;
    a controller; and
    a switch arrangement which is operably connected for actuation by the controller to energize the phase winding, the controller being responsive to the first and second signals to execute a procedure in accordance with the said intervals to actuate the switch arrangement to start the machine, wherein the controller includes a timer which is operable to time between the occurrence of the signals to determine, on receipt of a signal to start the machine, whether the rotor is substantially in motion, the controller enabling startup of the machine when the time exceeds a predetermined time without the occurrence of the said first or second signals.

10. A system as claimed in claim 9 in which the timer is resettable to monitor the progress of the rotor on startup by the controller according to the subsequent occurrence of the first and second signals.

11. An electric machine, comprising:

a stator defining stator poles;

a single phase winding for energizing one or more of the poles;

a rotor defining rotor poles;

a rotor position transducer comprising a member arranged to rotate with the rotor;

a first sensor arranged to be influenced by the movement of the member to produce first signals indicative of positions of the rotor relative to the stator of substantially zero torque; and a second sensor arranged to be influenced by the member to produce second signals indicative of positions angularly in advance of the first signals, intervals between the first signals and the second signals being indicative of different regions of torque production.

12. A machine as claimed in claim 1 in which the first and second signals are each transitions between states of a digital output of even mark/space ratio.

13. A machine as claimed in claim 1 in which the member defines a set of features for influencing the sensors to produce the first and second signals.

14. A machine as claimed in claim 1 in which the second signals are advanced with respect to the first signals by between 10% and 20% of the rotor pole pitch.

15. A machine as claimed in claim 14, in which the second signals are advanced with respect to the first signals by 17%.

16. A machine as claimed in claim 1 in which the stator, the phase winding and the rotor are arranged as a switched reluctance machine.

17. An electrical machine system comprising a machine as claimed in claim 1, a controller, and a switch arrangement which is operably connected for actuation by the controller to energize the phase winding, the controller being responsive to the first and second signals to execute a procedure in accordance with the said intervals to actuate the switch arrangement to start the machine.

18. A method of controlling an electrical machine system as claimed in claim 17, comprising:

selecting one of the first or second signals to time energization of the phase winding.

19. A system as claimed in claim 17 in which the controller is operable to decode the first and second signals, to determine whether the rotor is moving in the desired direction, and to continue or discontinue starting the machine in response to the decoded outputs.

20. A system as claimed in claim 17 in which the controller is operable to derive phase winding energization timing information from the first or second signals.

21. A system as claimed in claim 17 in which the controller includes a timer which is operable to time between the occurrence of the signals to determine, on receipt of a signal to start the machine, whether the rotor is substantially in motion, the controller enabling startup of the machine when the time exceeds a predetermined time without the occurrence of the said first or second signals.

22. A system as claimed in claim 21 in which the timer is resettable to monitor the progress of the rotor on startup by the controller according to the subsequent occurrence of the first and second signals.

23. An electric machine, comprising:

a stator defining stator poles;

phase-winding means for energizing one or more of the poles;

a rotor defining rotor poles;

a rotor position transducer comprising a member arranged to rotate with the rotor; and first and second sensing means, influenced by the movement of the member, for producing first and second signals indicative of positions of the rotor relative to the stator of substantially zero torque, and of positions angularly in advance of the first signals, intervals between the first and second signals being indicative of different regions of torque production.

24. The electric machine of claim 23, wherein the phase-winding means comprises a single phase winding.

25. The electric machine of claim 23, wherein the first and second sensing means comprises first and second sensors, the first sensor arranged to be influenced by the movement of the member to produce the first signals, and the second sensor being arranged to be influenced by the member to produce the second signals.

* * * * *

UNITED STATES PATENT AND TRADEMARK OFFICE
CERTIFICATE OF CORRECTION

PATENT NO : 6,091,170
DATED : July 18, 2000
INVENTOR(S) : Mayes et al.

It is certified that error appears in the above-identified patent and that said Letters Patent are hereby corrected as shown below:

Column 11, line 30, claim 12, the claim dependency numeral "1" should read --11--;

Column 11, line 33, claim 13, the claim dependency numeral "1" should read --11--;

Column 11, line 36, claim 14, the claim dependency numeral "1" should read --11--;

Column 11, line 41, claim 16, the claim dependency numeral "1" should read --11--;

Column 11, line 45, claim 17, the claim dependency numeral "1" should read --11--.

Signed and Sealed this

Tenth Day of April, 2001

*Attest:*

NICHOLAS P. GODICI

*Attesting Officer*     Acting Director of the United States Patent and Trademark Office